(12) United States Patent
Karol

(10) Patent No.: US 7,715,417 B2
(45) Date of Patent: May 11, 2010

(54) CREATING A TELECOMMUNICATIONS CHANNEL FROM MULTIPLE CHANNELS THAT HAVE DIFFERING SIGNAL-QUALITY GUARANTEES

(75) Inventor: Mark John Karol, Fair Haven, NJ (US)

(73) Assignee: Avaya Inc., Basking Ridge, NJ (US)

( * ) Notice: Subject to any disclaimer, the term of this patent is extended or adjusted under 35 U.S.C. 154(b) by 380 days.

(21) Appl. No.: 11/775,549

(22) Filed: Jul. 10, 2007

(65) Prior Publication Data

US 2009/0016370 A1 Jan. 15, 2009

(51) Int. Cl.
*H04L 12/56* (2006.01)
(52) U.S. Cl. ...................... 370/412; 370/352
(58) Field of Classification Search ............... 370/468, 370/352, 249, 231, 242, 510, 349; 709/232
See application file for complete search history.

(56) References Cited

U.S. PATENT DOCUMENTS

| | | | | |
|---|---|---|---|---|
| 6,134,217 A * | 10/2000 | Stiliadis et al. | ............ | 370/232 |
| 6,181,684 B1 * | 1/2001 | Turcotte et al. | ............ | 370/332 |
| 6,430,184 B1 * | 8/2002 | Robins et al. | ............ | 370/392 |
| 6,496,481 B1 * | 12/2002 | Wu et al. | ............ | 370/242 |
| 6,529,499 B1 * | 3/2003 | Doshi et al. | ............ | 370/352 |
| 6,574,213 B1 * | 6/2003 | Anandakumar et al. | ..... | 370/349 |
| 6,775,280 B1 * | 8/2004 | Ma et al. | ............ | 370/392 |
| 6,973,042 B1 * | 12/2005 | Fitzgerald | ............ | 370/249 |
| 7,126,918 B2 * | 10/2006 | Roberts | ............ | 370/235 |
| 7,142,513 B2 | 11/2006 | Sun et al. | | |
| 7,257,084 B1 * | 8/2007 | Srinivasan et al. | ......... | 370/235 |
| 7,283,518 B2 * | 10/2007 | Vikberg et al. | ............ | 370/352 |
| 7,315,900 B1 * | 1/2008 | Ofelt et al. | ............ | 709/238 |
| 7,424,035 B2 * | 9/2008 | Saleh et al. | ............ | 370/468 |
| 7,539,219 B2 * | 5/2009 | Kwong et al. | ............ | 370/510 |
| 2004/0261116 A1 * | 12/2004 | Mckeown et al. | ............ | 725/109 |
| 2005/0002335 A1 * | 1/2005 | Adamczyk et al. | ......... | 370/230 |
| 2005/0050221 A1 * | 3/2005 | Tasman et al. | ............ | 709/232 |
| 2006/0098625 A1 * | 5/2006 | King et al. | ............ | 370/352 |
| 2007/0109990 A1 * | 5/2007 | Bennett | ............ | 370/328 |
| 2007/0116025 A1 * | 5/2007 | Yadlon et al. | ............ | 370/412 |
| 2007/0206497 A1 * | 9/2007 | Plamondon et al. | ......... | 370/231 |

* cited by examiner

*Primary Examiner*—Thong H Vu
(74) *Attorney, Agent, or Firm*—DeMont & Breyer, LLC

(57) ABSTRACT

A technique is disclosed that enables the adaptive pooling of M transmission paths that offer a first signal-quality guarantee, or no guarantee at all, with N transmission paths that offer a second signal-quality guarantee. Through this adaptive pooling, a telecommunications channel is created that meets the quality of service or waveform quality required for a packet stream being transmitted, while not excessively exceeding the required quality. The technique adaptively recaptures any excess signal quality from one path and uses it to boost the quality of an inferior path. A node of the illustrative embodiment selects the paths to handle a current segment of source packets, based on one or more parameters that are disclosed herein. The node adapts to changing conditions by adjusting the transmission characteristics for each successive segment of packets from the source packet stream.

24 Claims, 6 Drawing Sheets

CREATING A TELECOMMUNICATIONS CHANNEL FROM MULTIPLE CHANNELS THAT HAVE DIFFERING SIGNAL-QUALITY GUARANTEES

FIELD OF THE INVENTION

The present invention relates to telecommunications in general, and, more particularly, to transmitting a stream of information packets via two or more transmission paths with differing signal-quality guarantees.

BACKGROUND OF THE INVENTION

FIG. 1 depicts a schematic diagram of a telecommunications network in the prior art, such as the Internet, which transports data packets from one node to another. Each endpoint, server, router, or other device that is capable of transmitting and/or receiving packets in the network is generically referred to as a "network node," or simply "node." A node that originates one or more packets, as part of a packet stream, is referred to as a "source node," and a node that acts as the terminus for a packet stream is referred to as a "destination node." For the purposes of this specification, a "network path" is defined as the physical route between a pair of source and destination nodes in a network.

The service provided by a network path is characterized by its "quality of service," which, for the purposes of this specification, is defined as a function of one or more of the bandwidth, error rate, and latency from one node to another. For the purposes of this specification, the "bandwidth" from one node to another is defined as an indication of the amount of information per unit time that can be transported from the first node to the second. Typically, bandwidth is measured in bits or bytes per second. For the purposes of this specification, the "error rate" from one node to another is defined as an indication of the amount of information that is corrupted as it travels from the first node to the second. Typically, error rate is measured in bit errors per number of bits transmitted or in packets lost per number of packets transmitted. For the purposes of this specification, the "latency" from one node to another is defined as an indication of how much time is required to transport information from one node to another. Typically, latency is measured in seconds.

In the transmission of any packet stream, there is a source node and a destination node. The two nodes can be the same type of device, such as two Voice-over-Internet-Protocol (VoIP) telephone clients communicating with each other, or can be different devices, such as a browser-equipped personal computer and a web server. Of course, the source node for one packet stream can be the destination node for another packet stream.

Some applications—e-mail, for example—are generally more tolerant of the quality of service provided by the network path, but some other applications—particularly VoIP telephony and streaming audio and video—are generally very sensitive and, as such, require a minimum quality of service to be present in the transmission path from source node to destination node.

Because the transmission path comprises the physical resources to ensure adequate operation in the worst case and because the network does not usually operate under the worst-case conditions, more resources are allocated to the transmission path than, on average, are necessary. This can result in a waste of transmission resources and money. Although various resource-allocation techniques, such as the pooling of a specific type of resource, can be employed to reduce this waste, some inefficiency still remains.

The need exists, therefore, for an invention that improves the utilization of resources during the transmission of a packet stream, without some of the disadvantages in the prior art.

SUMMARY OF THE INVENTION

The present invention enables the adaptive pooling of M transmission paths that offer a first signal-quality guarantee, or no guarantee at all, with N transmission paths that offer a second signal-quality guarantee. Through this adaptive pooling, a telecommunications channel is created that meets the signal quality required for a packet stream being transmitted, while not excessively exceeding the required signal quality. In other words, the described technique adaptively recaptures any excess signal quality from one transmission path and uses it to boost the signal quality of another transmission path that, by itself, either provides too low a signal-quality guarantee or does not provide any signal-quality guarantee.

Signal quality has been traditionally expressed in terms of one or more quality-of-service characteristics, such as bandwidth, error rate, and latency. In accordance with the illustrative embodiment, signal quality can also be expressed in terms of one or more "media quality" waveform characteristics, such as loudness, audio distortion, noise, echo, and so forth.

In accordance with the illustrative embodiment of the present invention, a source node selects transmission paths to handle the transmission, to a destination node, of a current segment of L packets from a source packet stream. The paths to be used are based on:

i. one or more signal-quality requirements that govern the transmission, or ii. the availability of each type of transmission path—that is, availability among the M paths that provide a signal-quality guarantee of a first level (or no guarantee), availability among the N paths that provide a signal-quality guarantee at a second level, and so forth, or iii. the known signal-quality guarantee associated with a path in a signal-quality guaranteed network, if available, or iv. one or more signal-quality evaluations of each transmission path being considered, or v. the monetary cost associated with transmitting packets via each transmission path being considered, or vi. a characteristic, such as error sensitivity, of the information conveyed by one or more specific packets, or vii. any combination of i, ii, iii, iv, v, and vi.

As those who are skilled in the art will appreciate, the transmission paths that are selected can be based on additional or other parameters that are made available to the node.

In some embodiments, a first portion of the L source packets can originate at a first source, such as a first VoIP endpoint; a second portion can originate at a second source, such as a second VoIP endpoint; and so forth. In other words, the L packets can comprise packets from multiple media streams.

Each set of packets to be transmitted via a different, selected transmission path comprises at least some of the L source packets. The composition of each set of packets transmitted via each path can be based on one or more of the parameters listed above.

In some embodiments, one set of packets to be transmitted comprises P packets from the L source packets, where the P packets are also present in at least one other set of packets to be transmitted. In other words, some of the source packets can be transmitted across multiple transmission paths. The particular set of P packets that are replicated, as well as the value for P (i.e., the number of packets that are replicated), can be based on one or more of the parameters listed above.

Additionally, the source node can optionally add Q error correction bits to one or more sets of packets that comprise some or all of the L source packets acquired. In accordance with the illustrative embodiment, the value for Q is based on one or more of the parameters described above. For example, if the QoS evaluation of a first transmission path indicates a high bit error rate, node 211 might add more error correction bits than if the bit error rate was low, for a given QoS requirement.

The source node of the illustrative embodiment transmits the prepared sets of packets via the selected transmission paths, and then acquires the next L-packet segment of the source packet stream. As the QoS requirements and conditions change along the various transmission paths, the node adapts by adjusting the transmission characteristics (e.g., transmission paths, composition of each transmitted set of packets, etc.) for each successive segment of L source packets, where the value for L can vary across segments.

The illustrative embodiment of the present invention comprises: acquiring i) a source packet stream of L packets and ii) at least one quality-of-service requirement that governs transmission of the source packet stream; transmitting, from a first node to a second node, a first non-empty set of packets that constitute the source packet stream, via a first transmission path; and transmitting, from the first node to the second node, a second non-empty set of packets that constitute the source packet stream, via a second transmission path which provides a known quality-of-service guarantee that meets or exceeds the at least one quality-of-service requirement; wherein the first set of packets and the second set of packets are based on the at least one quality-of-service requirement and the known quality-of-service guarantee.

DETAILED DESCRIPTION

Figure 1:
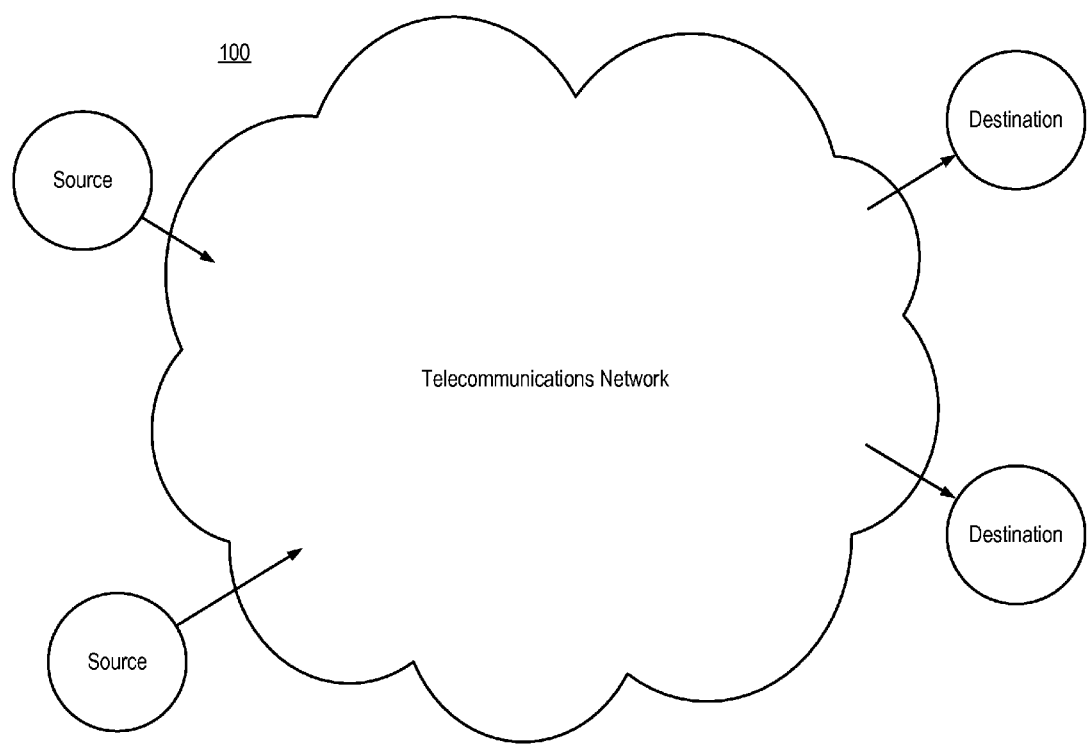
FIG. 1 depicts a schematic diagram of a telecommunications network in the prior art.
Figure 2:
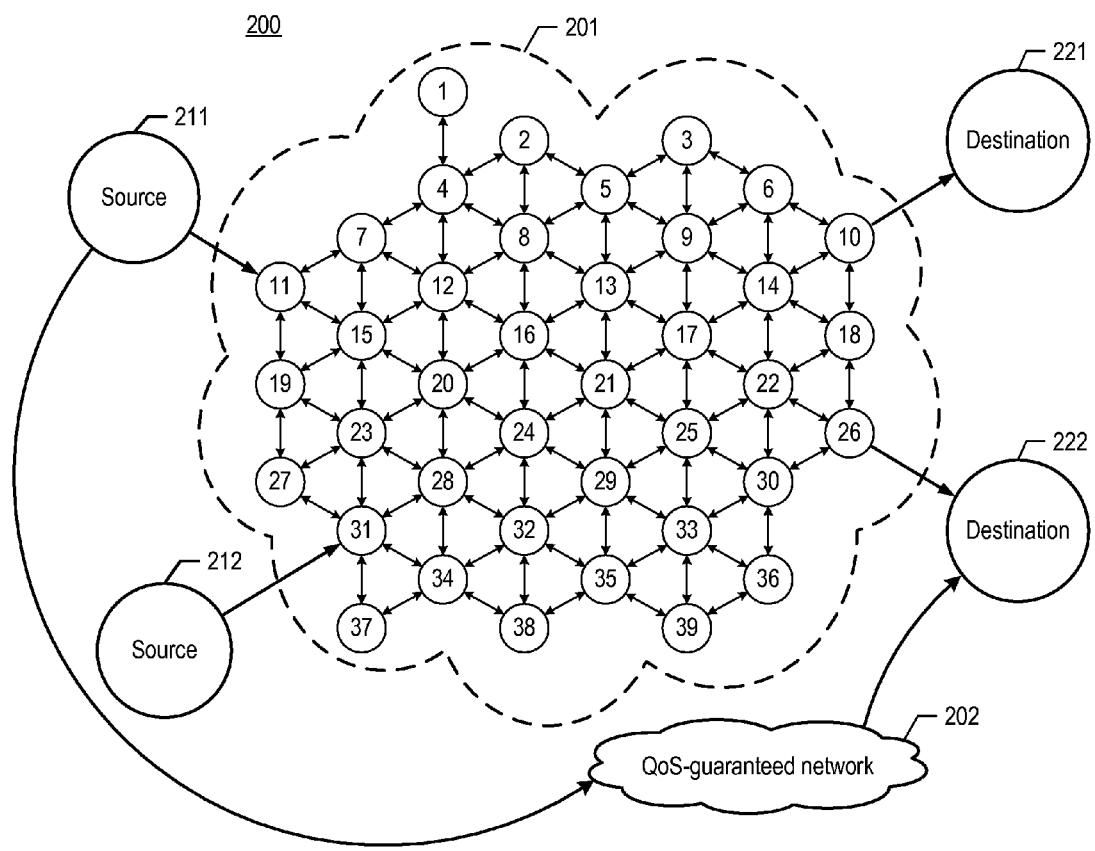
FIG. 2 depicts a schematic diagram of the salient components of telecommunications system 200 in accordance with the illustrative embodiment of the present invention.

FIG. 2 depicts a schematic diagram of the salient components of telecommunications system 200 in accordance with the illustrative embodiment of the present invention. System 200 comprises source nodes 211 and 212, destination nodes 221 and 222, and networks 201 and 202, interconnected as shown. FIG. 2 also depicts the physical resources that compose network 201.

In accordance with the illustrative embodiment, nodes 211, 212, 221, and 222 are Voice over Internet Protocol (VoIP) telephone endpoints. However, it will be clear to those skilled in the art, after reading this specification, how to make and use alternative embodiments of the present invention in which some or all of the nodes are something other than VoIP endpoints.

Network 201 does not provide a quality-of-service guarantee to any packet or stream of packets that it transports from a source node to a destination node, such as Real-time Transport Protocol (RTP) packets. Therefore, the provisioning of real-time services such as streaming audio and telephony, from a source node to a destination node, can be problematic without the present invention.

Network 201 comprises a plurality of nodes and their physical interconnections, arranged in the topology shown. It will be clear to those skilled in the art, however, after reading this specification, how to make and use alternative embodiments of the present invention with networks that comprise any number of nodes and have any topology. In particular, it will be clear to those skilled in the art, after reading this specification, how to make and use embodiments of the present invention with the Internet.

Each node in network 201 is capable of receiving a packet and of forwarding that packet to another node, in well-known fashion, based on the destination address in the packet. For example, when node 11 receives a packet from source node 211, which packet contains node 26 as its destination address, node 11 must decide which of its adjacent nodes—nodes 7, 15, and 19—to forward the packet to.

Each node in network 201 decides which adjacent node to forward each packet to based on: (1) the destination address in the packet, and (2) a routing table in the node. For example, table 1 depicts a routing table for node 11 in accordance with the illustrative embodiment of the present invention.

TABLE 1

Routing Table for Node 11

| Destination node Address | Preferred Next Node | First Alternative Next Node | Second Alternative Next Node |
|---|---|---|---|
| 1 | 7 | 15 | 19 |
| 2 | 7 | 15 | 19 |
| 3 | 7 | 15 | 19 |
| ... | ... | ... | ... |
| 26 | 15 | 7 | 19 |
| ... | ... | ... | ... |
| 37 | 19 | 15 | 7 |
| 38 | 19 | 15 | 7 |
| 39 | 19 | 15 | 7 |

When all of the resources in the network are functioning and there is little network congestion, each node forwards a packet to the preferred next node listed in the routing table. For example, when node 11 receives a packet with the destination address 26, the preferred next node is node 15. Each node forwards a packet to the node listed as the entry for the preferred next node and the packet progresses from one preferred next node to the next and the next and so on until it reaches its destination node. For the purposes of this specification, the "primary nominal path" is defined as the chain of preferred next nodes from a source node to a destination node.

In contrast, when the preferred next node is not functioning or there is congestion at the preferred next node, the routing node can alternatively route the packet to the first alternative next node. For example, the first alternative next node at node 11 for a packet with the destination address 26 is node 7. And when the first alternative node is not functioning or there is congestion at the first alternative next node, the routing node can route the packet to the second alternative next node. The second alternative next node at node 11 for a packet with the destination address 26 is node 19.

It is also possible for a source node such as node 211 to determine or influence the transmission path that is used to transport a stream of packets, instead of strictly leaving it to the routing tables to determine the path of each packet. As described below and with respect to FIG. 5, node 211 is able to specify at least one intermediate relay node (e.g., node 3, etc.) in network 201 through which to transmit a stream of packets to a destination node, in accordance with the illustrative embodiment of the present invention. Node 211 might want to change transmission paths, for example, when the quality of service on a transmission path currently being used becomes unsatisfactory.

Network 202 is able to provide a quality-of-service guarantee to any packet or stream of packets (e.g., RTP packets, etc.) that it transports, in accordance with the illustrative embodiment. For example, network 202 can transport packets from source node 211 to destination node 222 with a known quality-of-service guarantee. A source node such as source node 211 might select network 202 to transport at least some packets for applications that require those packets to be received at the required quality of service by the destination node. One example is a video streaming application that compresses the source stream by using layered coding, as is known in the art; in layered coding, the base-layer sub-stream must be received to guarantee a basic level of reconstruction quality. It will be clear to those skilled in the art how to make and use network 202 for the purpose of providing a quality-of-service guarantee. Alternatively, a source node might use network 202 in combination with network 201 to transport packets, in order to achieve a target quality-of-service level, in accordance with the illustrative embodiment of the present invention.

Figure 3:
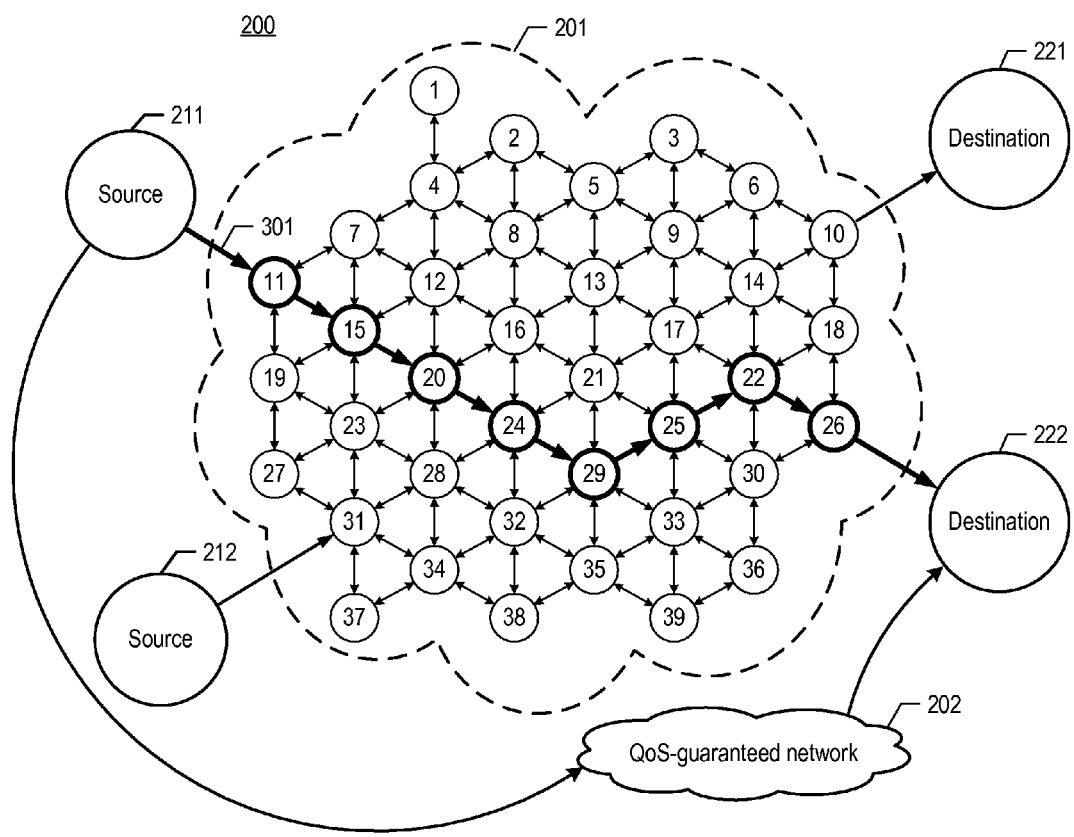
FIG. 3 depicts source node 211 transmitting a stream of packets to destination node 222 through network 201 via primary nominal path 301.

FIG. 3 depicts source node 211 transmitting a stream of packets to destination node 222 through network 201 via primary nominal path 301 for the particular pair of nodes, which path comprises nodes 11, 15, 20, 24, 29, 25, 22, and 26. For any pair of source and destination nodes, there always exists one primary nominal path. When any of the nodes in the primary nominal path are not functioning or are experiencing congestion, a node in the primary nominal path can divert the packet from the primary nominal path onto an "alternative nominal path." For the purposes of this specification, an "alternative nominal path" is defined as a chain of preferred and alternative next nodes from a source node to a destination node. Additionally, for the purposes of this specification, a node in a network that is within the subgraph of nominal paths (i.e., primary and alternative nominal paths) is defined as a "nominal path node" and a node that is not within the subgraph of nominal paths is defined as an "extranominal path node." In accordance with the illustrative embodiment, the transmission path depicted in FIG. 3 is one of M transmission paths accessible by source node 211 that fail to provide any quality-of-service guarantee.

Figure 4:
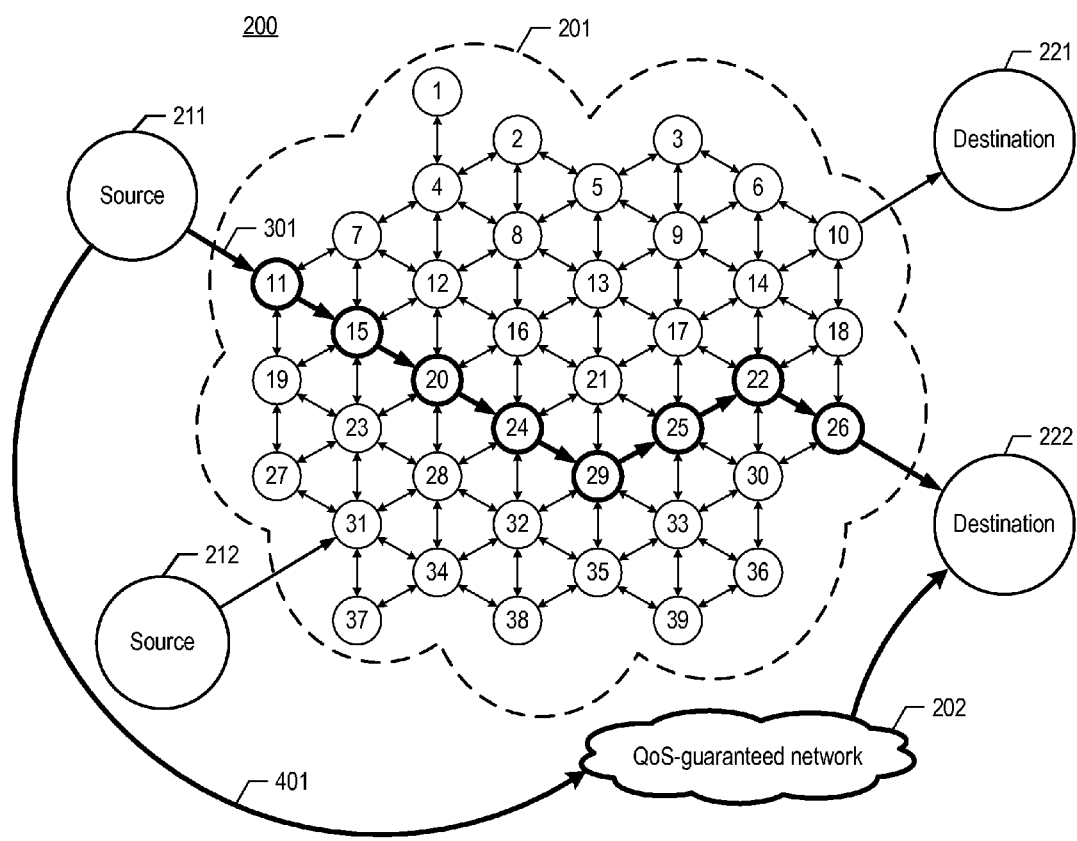
FIG. 4 depicts source node 211 transmitting a stream of packets to destination node 222 through network 202 along path 401 that provides a known quality-of-service guarantee.

FIG. 4 depicts source node 211 transmitting a stream of packets to destination node 222 through network 202 along path 401 that provides a known quality-of-service (QoS) guarantee. In accordance with the illustrative embodiment, the transmission path through network 202 that is depicted in FIG. 3 is one of N transmission paths (e.g., through network 202, etc.) accessible by source node 211 with a quality-of-service guarantee at or exceeding a known level. As depicted in FIG. 4, source node 211 transmits, via path 301 through network 201, at least a first part of a source packet stream generated either by node 211 itself or externally to node 211 and also transmits, via QoS-guaranteed path 401 through network 202, at least a second part of the source packet stream, in accordance with the illustrative embodiment.

Figure 5:
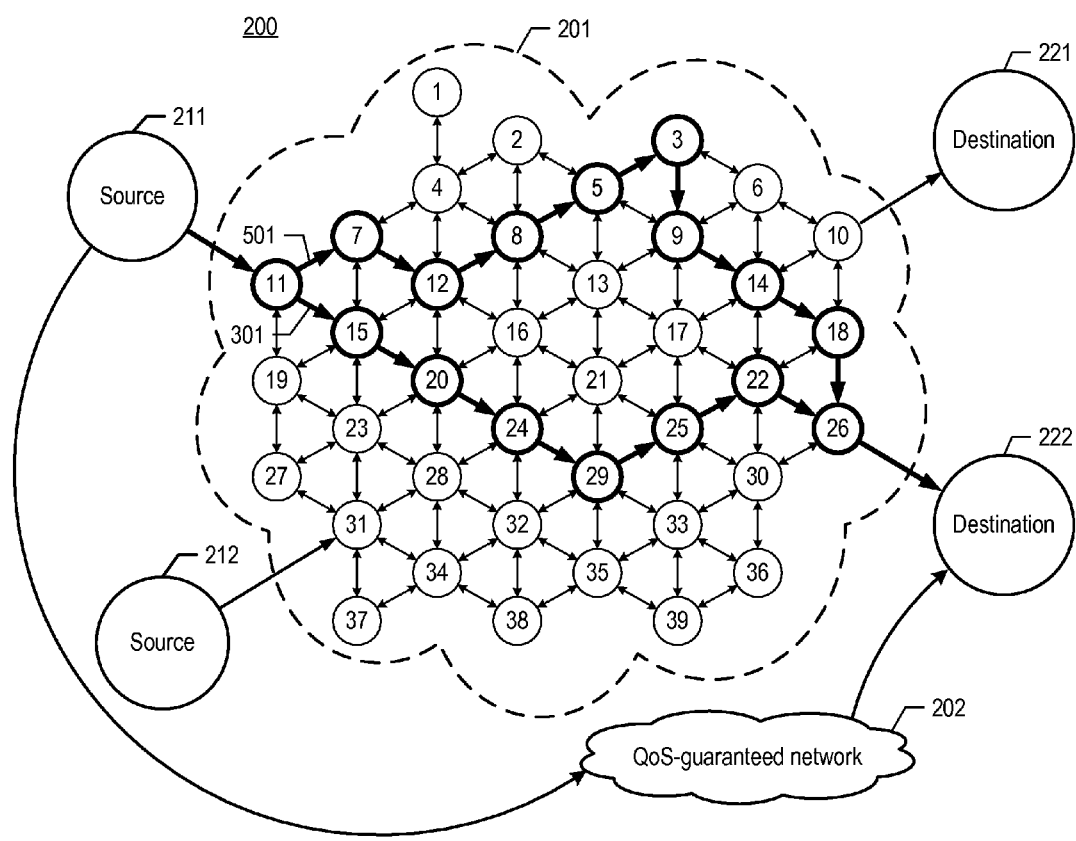
FIG. 5 depicts the use of an extranominal path node as a relay node for one or more packets that leave source node 211 for destination node 222.

FIG. 5 depicts the use of an extranominal path node—in this example, node 3—as a relay node, or "ricochet" node, for one or more packets that leave source node 211 for destination node 222. A relay node is addressable by a source node and is able to relay traffic packets between the source and destination nodes that are engaged in a transfer of packets. The relay node enables a source node to intentionally choose an advantageous path for the transmission of a packet or packets. When a relay node receives a packet, the node determines that at least some of the received packets are to be forwarded to the destination node whose address has been specified by the source node. The destination node's address can reside, for example, within the data portion of the original packet transmitted to the relay node, which extracts the address and forwards at least part of the data portion (as a packet) to the destination node. The effect of having at least one relay node available is that by giving the source node more than one option for routing each packet through network 201, the likelihood is increased that the source node can route the packet through a transmission path with a satisfactory quality of service. This is in contrast to allowing the packets to be routed through the network purely by using the routing table of each intermediate node.

In this example in which node 3 also serves as a relay node, the packet takes a first path from source node 211 to node 3 and then a second path to destination node 222. The path from source node 211 to destination node 222 through node 3 is indirect, in contrast to one of the nominal paths from source node 211 to destination node 222, because source node 211 specifies node 3 in the packet's path. In other words, when source node 211 specifies an intermediate relay node in the packet's path on its way to destination 222, the packet is taking an indirect path—regardless of whether the relay node is a nominal path node or not.

As depicted in FIG. 5, source node 211 transmits, via primary nominal path 301, at least a first part of a source packet stream generated either by node 211 itself or externally to node 211 and also transmits, via transmission path 501 through relay node 3, at least a second part of the source packet stream, in accordance with the illustrative embodiment. Although transmissions involving two paths are depicted in FIGS. 4 and 5, it will be clear to those skilled in the art how to make and use embodiments of the present invention in which a source node is able to transmit packets from a given source packet stream through three or more distinct paths. To summarize, such paths include a nominal path as described with respect to FIG. 3, a QoS-guaranteed path as described with respect to FIG. 4, and a transmission path through a specified relay node as described with respect to FIG. 5.

Figure 6:
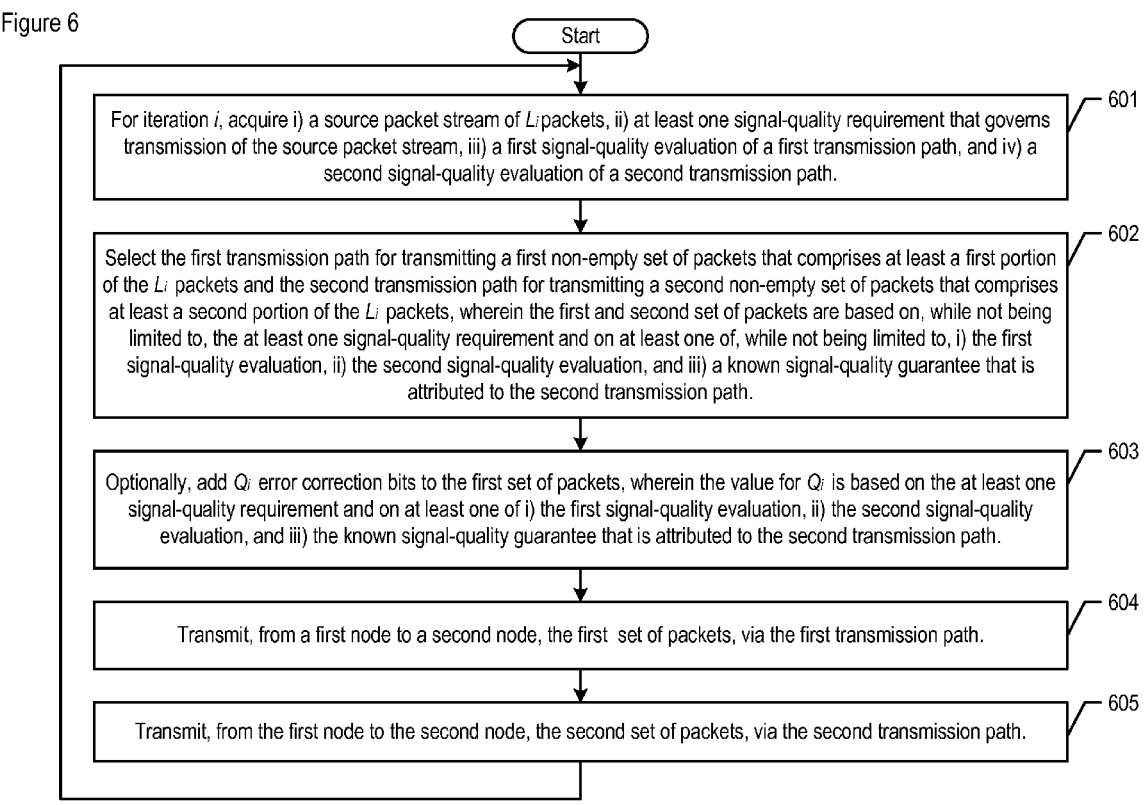
FIG. 6 depicts a flowchart of the salient tasks associated with a source node handling and transmitting packets from a source packet stream, in accordance with the illustrative embodiment of the present invention.

FIG. 6 depicts a flowchart of the salient tasks associated with a source node handling and transmitting packets from a source packet stream, in accordance with the illustrative embodiment of the present invention. For pedagogical purposes, source node 211 as depicted is transmitting a voice packet stream to destination node 222 and also evaluates various transmission paths (e.g., through relay nodes, etc.) for the purpose of optimizing the transmission of the packet stream via a combination of paths. As those who are skilled in the art will appreciate, in some alternative embodiments, a node other than source node 211 (e.g., a node other than a VoIP endpoint, etc.) can perform the described tasks on packets that carry media traffic other than voice, such as video traffic. In other alternative embodiments, a node other than node 211 can provide the transmission path evaluations so that node 211 can use those evaluations for the purpose of selecting transmission paths for transmission purposes. Furthermore, as those who are skilled in the art will appreciate, some or all of the depicted tasks can be combined or performed in a different order than that depicted.

At task 601, source node 211 acquires L packets in a source packet stream of voice traffic, either self-generated by node 211 (e.g., representing the speech of the node's user, etc.) or received from an external source or sources, in well-known fashion. In some embodiments, node 211 might receive a first portion of the L packets from a first source (e.g., a first VoIP endpoint, etc.), a second portion from a second source (e.g., a second VoIP endpoint, etc.), a third portion from a third source (e.g., a digital video camera, etc.), and so forth.

Node 211 also receives at least one signal quality requirement that governs the transmission of the source packet stream. Signal quality can be expressed in terms of quality of service (QoS). As is well known to those skilled in the art, the QoS of a transmission path is measured by:
  i. bandwidth, or
  ii. error rate, or
  iii. latency, or
  iv. a derivative or associated function of bandwidth, or
  v. a derivative or associated function of error rate, or
  vi. a derivative or associated function of latency (e.g., jitter, etc.), or
  vii. any combination of i, ii, iii, iv, v, and vi.

For example, node 211 might be required to transmit 32 kilobit-per-second voice traffic with no more than 50 milliseconds of latency and a $10^{-4}$ bit error rate or less. The QoS requirements might have been provisioned in node 211 prior to its use or the requirements might be provided to the node while in use. For example, broadband telephone service providers often enable an end user to control the bandwidth requirement in effect during a call, by adjusting a parameter through a software application running on the user's personal computer. As those who are skilled in the art will appreciate, the QoS requirements can comprise at least one of i) one or more error rate requirements, ii) one or more latency requirements, and iii) one or more bandwidth requirements.

Node 211, in some embodiments, can receive a signal quality requirement that is in terms of the "waveform quality" of the media signal that is conveyed in a packet stream. The waveform quality is a measure of how well a media signal that is received at a device compares with what is required to be received at that device, when assessed at the waveform level. A media signal can be an audio signal, a video signal, a modem traffic signal, a TTY signal, a facsimile signal, or some other signal that can be characterized as having a waveform. The device can be the intended destination of the media signal within a telecommunications system or it can be an intermediate node within the telecommunications system. Waveform quality is distinguished from quality of service, in that quality of service is a measure that is performed at the packet level, but waveform quality is a measure that is performed on the media signal itself. Waveform quality is a function of, but is not limited to, one or more of the following waveform characteristics:
  i. loudness,
  ii. audio distortion,
  iii. noise,
  iv. fading,
  v. crosstalk,
  vi. echo, and
  vii. video distortion (e.g., spatial, temporal, optical, etc.).

In addition to receiving one or more signal quality requirements, source node 211 also obtains information about transmission paths that provide a known signal quality guarantee. For example, node 211 is made aware of one or more paths (e.g., through network 202, etc.) that guarantee a particular error rate, latency, or bandwidth, alone or in combination with one another.

For those transmission paths that have either unknown or time-varying signal quality levels, source node 211 obtains signal quality evaluations of the transmission paths, in well-known fashion. For example, node 211 can obtain evaluations for one or more transmission paths though specified relay nodes, as well as for the nominal paths as determined by the routing tables of the intermediate nodes involved. Node 211 uses the evaluations to at least provide a "best guess" of the signal quality to expect, at least in the short term, on one or more of the transmission paths to be considered for packet transmission, as described below and with respect to task 602.

At task 602, source node 211 selects R transmission paths to handle the transmission of the L packets from node 211 to node 222. In accordance with the example provided, two transmission paths are selected (i.e., R is equal to two), each of which is for transmitting at least part of the L packets. As those who are skilled in the art will appreciate, however, a different number of transmission paths can be selected, where each path either provides a signal-quality guarantee or fails to provide a signal-quality guarantee.

Each of i) the number of paths to be used and ii) the selection of each transmission path, is based on:
  i. one or more signal quality (e.g., QoS, waveform quality, etc.) requirements that govern the transmission, or
  ii. the availability of each type of transmission path—that is, availability among the M paths that do not provide any signal quality guarantee, availability among the N paths that do provide a signal quality guarantee, and so forth, or
  iii. the known signal quality guarantee associated with a path in network 202 (or other quality-guaranteed network), if available, or
  iv. one or more evaluations (e.g., quality-of-service, waveform quality, etc.) of each transmission path being considered, or
  v. the monetary cost associated with transmitting packets via each transmission path being considered, or
  vi. a characteristic, such as error sensitivity, of the information conveyed by one or more specific packets, or
  vii. any combination of i, ii, iii, iv, v, and vi.

As those who are skilled in the art will appreciate, the value for R and the selection of each path can be based on additional or other parameters that are made available to node 211.

The set of packets to be transmitted via a selected transmission path comprises at least part of the L source packets, where the multiple selected paths can be used to handle different sets of packets comprising differing parts of the L packets. The composition of each set of packets is based on one or more of the parameters listed earlier with respect to task 602. As those who are skilled in the art will appreciate, the composition of each set of packets can be based on additional or other parameters that are made available to node 211.

In some embodiments, one set of packets (e.g., a second set of packets, etc.) comprises P packets from the L source packets acquired at task 601, where the P packets are also present in another set of packets (e.g., a first set of packets, etc.). In other words, some of the source packets can be transmitted across multiple transmission paths. The particular set of P packets that are replicated, as well as the value for P (i.e., the number of packets that are replicated), is based on one or more of the parameters listed earlier with respect to task 602. As those who are skilled in the art will appreciate, after reading this specification, the P packets and the value for P can be based on additional or other parameters that are made available to node 211.

At task 603, source node 211 optionally adds Q error correction bits to one or more sets of packets (e.g., the first set of packets, etc.) that comprise some or all of the L packets from the source packet stream. In accordance with the illustrative embodiment, the value for Q is based on one or more of the parameters described above and with respect to task 602. For example, if the QoS evaluation of a first transmission path indicates a high bit error rate, node 211 might add more error correction bits than if the bit error rate was low, for a given QoS requirement. As those who are skilled in the art will appreciate, after reading this specification, the value for Q can be based on additional or other parameters that are made available to node 211.

At task 604, source node 211 transmits a first non-empty set of packets that constitute the L packets from the source packet stream, via a first transmission path. In some embodiments, the first transmission path fails to provide any QoS guarantee. For example, if a first transmission path in network 201 provides a QoS guarantee at a first known level (or no QoS guarantee at all) and a second transmission path in network 202 provides a QoS guarantee at a second known level, node 211 might transmit some of the packets via the first transmission path, at task 604, and some via the second transmission path, at task 605.

At task 605, source node 211 transmits a second non-empty set of packets that constitute the L packets from the source packet stream, via a second transmission path which provides a known QoS guarantee that meets or exceeds the QoS requirements obtained at task 601. In some alternative embodiments, the second transmission path fails to provide any QoS guarantee, but might at least provide an overall improvement when used in combination with the first transmission path.

As those who are skilled in the art will appreciate, node 211 can also transmit one or more additional sets of packets out of the L packets via one or more additional transmission paths than the two described in the example.

In some embodiments, where node 211 acquired, at task 601, different portions of the L packets from different sources (e.g., different VoIP endpoints, etc.), node 211 might transmit at least a first packet from the first portion via the first transmission path, a second packet from the first portion via the second transmission path, and so forth. Additionally, node 211 might transmit at least a first packet from the second portion via the first transmission path, a second packet from the second portion via the second transmission path, and so forth. As those who are skilled in the art will appreciate, packets that originate from the different sources can be transmitted via any combination of the transmission paths.

After task 605, task execution proceeds back to task 601, in order to handle the next set of L packets in the source packet stream, where the value for L can vary across sets. As the QoS requirements and conditions change along the various transmission paths, node 211 adapts by adjusting the transmission characteristics (e.g., transmission paths, composition of each transmitted set of packets, etc.) for the next set of L source packets, in accordance with the illustrative embodiment.

In the example provided with respect to FIG. 6, the data being transferred is manipulated at the packet level. It will be clear to those skilled in the art, after reading this specification, how to make embodiments of the invention in which node 211 manipulates the transferred data at the bit level. One such example of this is now described. In the example, source node 211 is transmitting packets from a Voice over Internet Protocol (VoIP) call to destination node 222. Node 211 can choose to transfer all of the voice bits from the call on a single transmission path with a guaranteed signal quality; however, this can be very expensive in terms of monetary cost, especially if the guaranteed signal quality greatly exceeds the minimum level of satisfactory signal quality. Instead, node 211 distributes the voice bits over two or more paths, including the path with the guaranteed signal quality. By doing so, node 211 transfers only a fraction of the call's voice bits via the expensive path, while node 211 transfers the remainder of the call's voice bits on less expensive paths.

In particular, node 211 transfers the most-significant bits of each speech sample on the expensive high-quality path or paths and the less-significant bits on the inexpensive low-quality path or paths. As those who are skilled in the art will appreciate, the bits in each speech sample can be processed in this manner, regardless of whether the samples are unencoded pulse-code modulation (PCM) samples or are codec-processed samples.

If the signal-quality characteristic being considered is jitter, then on the receiving end when the jitter of the low-quality path is low (i.e., the signal quality is high), destination node 222 adds the less-significant bits of each speech sample to the more-significant bits, which results in received speech with a high mean opinion score (MOS). In contrast, when the jitter of the low-quality path is high (i.e., the signal quality is low), then destination node 222 discards the less-significant bits and uses only the more-significant bits from the high-quality path. The system of the illustrative embodiment manipulates the overall MOS level by varying how many bits are transmitted on each path.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   acquiring, at a first packet handling device, i) a source packet stream of L packets and ii) at least one quality-of-service requirement that governs transmission of the source packet stream;
   transmitting, from the first packet handling device to a second packet handling device, a first non-empty set of packets that are at least some of the L packets of the source packet stream, along a first transmission path; and
   transmitting, from the first packet handling device to the second packet handling device, a second non-empty set of packets that are at least some of the L packets of the source packet stream, along a second transmission path which provides a known quality-of-service guarantee that meets or exceeds the at least one quality-of-service requirement;
   wherein the first set of packets and the second set of packets are based on the at least one quality-of-service requirement and the known quality-of-service guarantee.

2. The method of claim 1 wherein the first transmission path is one of M transmission paths accessible by the first packet handling device that fail to provide any quality-of-service guarantee and the second transmission path is one of N transmission paths accessible by the first packet handling device that provide the known quality-of-service guarantee.

3. The method of claim 2 wherein the second set of packets is also based on monetary cost associated with the transmission of packets via the second transmission path.

4. The method of claim 1 wherein a first portion of the L packets originates from a first source and a second portion of the L packets originates from a second source.

5. The method of claim 4 wherein at least a first packet from the first portion is part of the first set of packets transmitted and at least a second packet from the first portion is part of the second set of packets transmitted.

6. The method of claim 5 wherein at least a first packet from the second portion is part of the first set of packets transmitted and at least a second packet from the second portion is part of the second set of packets transmitted.

7. A method comprising:
acquiring, at a packet handling device, i) a source packet stream of L packets, ii) at least one quality-of-service requirement that governs transmission of the source packet stream, iii) a first quality-of-service evaluation of a first transmission path, and iv) a second quality-of-service evaluation of a second transmission path;
transmitting, from the packet handling device, a first non-empty set of packets that are at least some of the L packets of the source packet stream, along the first transmission path; and
transmitting, from the packet handling device, a second non-empty set of packets that are at least some of the L packets of the source packet stream, along the second transmission path;
wherein the first set of packets and the second set of packets are based on the at least one quality-of-service requirement, the first quality-of-service evaluation, and the second quality-of-service evaluation.

8. The method of claim 7 wherein the second set of packets is also based on monetary cost associated with the transmission of packets via the second transmission path.

9. The method of claim 7 wherein the second set of packets further comprises P packets from the source packet stream that are also in the first set of packets, wherein the P packets are based on the at least one quality-of-service requirement, the first quality-of-service evaluation, and the second quality-of-service evaluation.

10. The method of claim 9 wherein the P packets are also based on the information that the P packets represent.

11. The method of claim 10 wherein the value for P is based on the at least one quality-of-service requirement, the first quality-of-service evaluation, and the second quality-of-service evaluation.

12. The method of claim 7 further comprising adding, at the packet handling device, Q error correction bits to the first set of packets, wherein the value for Q is based on the at least one quality-of-service requirement, the first quality-of-service evaluation, and the second quality-of-service evaluation, and wherein the at least one quality-of-service requirement comprises an error rate requirement.

13. The method of claim 7 wherein a first portion of the L packets originates from a first source and a second portion of the L packets originates from a second source.

14. The method of claim 13 wherein at least a first packet from the first portion is part of the first set of packets transmitted and at least a second packet from the first portion is part of the second set of packets transmitted.

15. The method of claim 14 wherein at least a first packet from the second portion is part of the first set of packets transmitted and at least a second packet from the second portion is part of the second set of packets transmitted.

16. A method comprising:
acquiring, at a packet handling device, i) a source packet stream of L packets and ii) at least one quality-of-service requirement that governs transmission of the source packet stream;
transmitting, from the packet handling device, a first non-empty set of packets that are at least some of the L packets of the source packet stream, along a first transmission path which fails to provide any quality-of-service guarantee; and
transmitting, from the packet handling device, a second non-empty set of packets that are at least some of the L packets of the source packet stream, along a second transmission path which provides a known quality-of-service guarantee that meets or exceeds the at least one quality-of-service requirement, the second set of packets comprising P packets from the source packet stream that are also in the first set of packets;
wherein the first set of packets, the second set of packets, and the P packets are based on the at least one quality-of-service requirement and the known quality-of-service guarantee.

17. The method of claim 16 wherein the P packets are also based on the information that the P packets represent.

18. The method of claim 17 wherein the value for P is based on the at least one quality-of-service requirement and the known quality-of-service guarantee.

19. The method of claim 16 further comprising adding, at the packet handling device, Q error correction bits to the first set of packets, wherein the value for Q is based on the at least one quality-of-service requirement and the known quality-of-service guarantee, and wherein the at least one quality-of-service requirement comprises an error rate requirement.

20. The method of claim 16 wherein the first transmission path is one of M transmission paths accessible by the packet handling device that fail to provide any quality-of-service guarantee and the second transmission path is one of N transmission paths accessible by the packet handling device that provide the known quality-of-service guarantee.

21. The method of claim 20 wherein the second set of packets is also based on monetary cost associated with the transmission of packets via the second transmission path.

22. The method of claim 16 wherein a first portion of the L packets originates from a first source and a second portion of the L packets originates from a second source.

23. The method of claim 22 wherein at least a first packet from the first portion is part of the first set of packets transmitted and at least a second packet from the first portion is part of the second set of packets transmitted.

24. The method of claim 23 wherein at least a first packet from the second portion is part of the first set of packets transmitted and at least a second packet from the second portion is part of the second set of packets transmitted.

* * * * *